Patented Sept. 13, 1927.

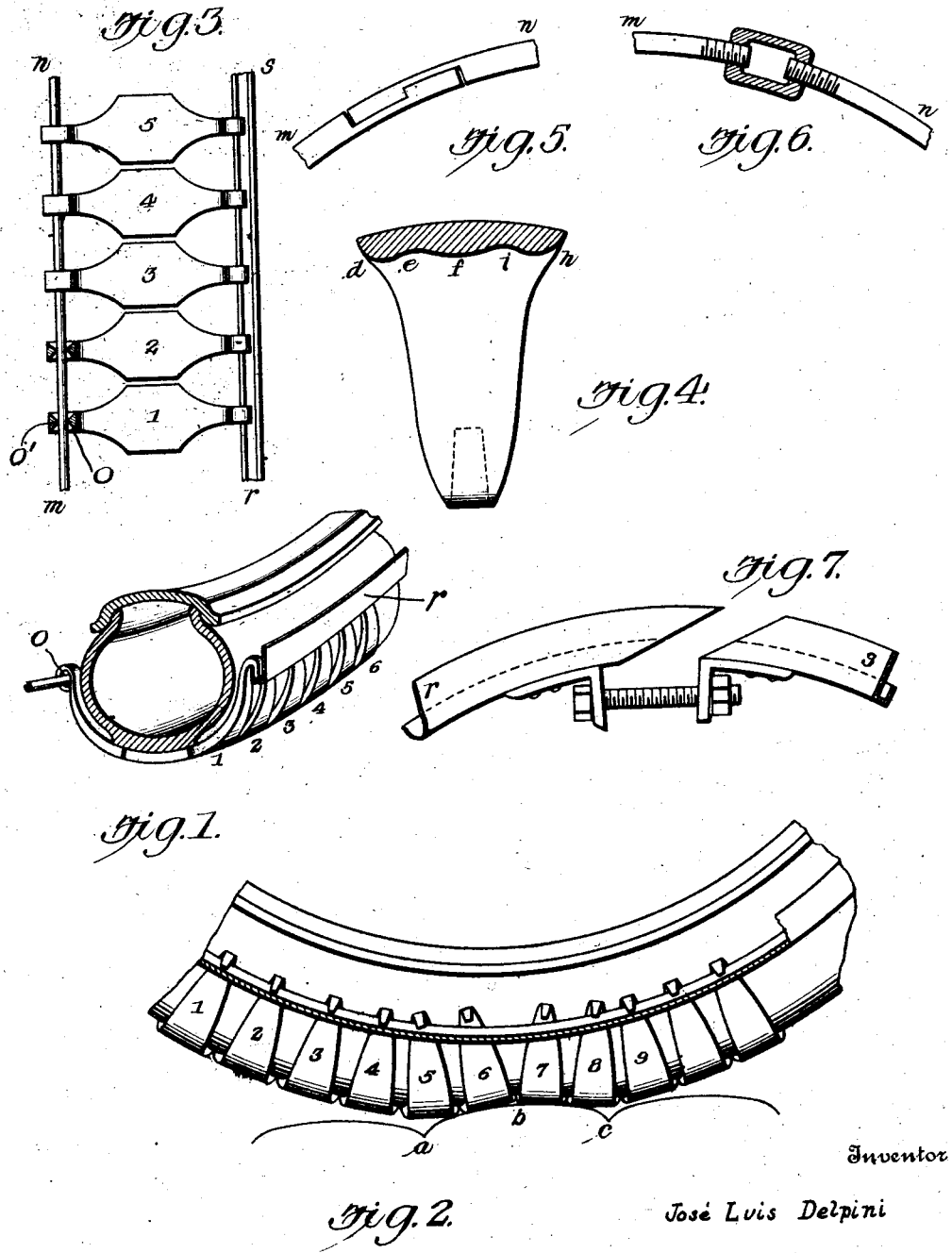

1,642,104

UNITED STATES PATENT OFFICE.

JOSÉ LUIS DELPINI, OF BUENOS AIRES, ARGENTINA.

PROTECTIVE COVER FOR PNEUMATIC TIRES AND THE LIKE.

Application filed February 27, 1925, Serial No. 12,123, and in Argentina August 22, 1924.

My present invention relates to a new device by which the wear on the tires, air chambers or pneumatic covers is avoided, its object being to provide a protective cover which may be quickly dismantled, which may be made of any material capable of withstanding the usual wearing stresses to which the covers are ordinarily subjected and which does not offer any practical resistance to the instantaneous deformations to which the ordinary pneumatic or solid tires are subjected.

In the appended drawings I have shown a practical embodiment of my device.

Figure 1 thereof is a sectional perspective view showing the improved cover in use;

Fig. 2 is a side elevation with parts in section;

Fig. 3 is a plan view of the cover;

Fig. 4 is an enlarged cross-section of one of the members of the cover;

Figs. 5 and 6 are enlarged details of means for securing together the ends of one of the fastening rings of the cover; and Fig. 7 is a detail view of a securing means for the other ring.

My protective cover consists of a series of bowed strips 1, 2, 3, 4 5 .... of a suitable material capable of withstanding all wear incident to rubbing against pavements of any kind and which may be each indeformable when made out of metallic material. These strips are designed to transversely straddle the tire and to conform to the curvature thereof.

All said strips are mutually connected by means of an iron or other suitable ring $m$ $n$ which is passed through the loops $o$ formed at one end of said strips. At their other end all said strips are hooked over the inner wall of a trough shaped ring $r$ $s$ as clearly shown in Figures 1, 2 and 3. The particular purpose of said ring $r$ $s$ is not only to retain one end of the protective strips but also to protect the adjacent side of the pneumatic tire against friction on the curbs of the road which is effected by the outer wall of the ring, this wall being wider than the inner wall. In consequence the ring $m$ $n$ is placed at the inner side of the wheel and the ring $r$ $s$ at the outside thereof.

It is obvious from the foregoing and from the appended drawings that my device affords an effective protection against wear on the pavement, without in any manner interfering with the characteristic instantaneous deformations of the tire. On reference to Figure 2, it will be seen that the strips 5, 6, 7 and 8 have accommodated themselves to the unevenness of the portions $a$ $b$ $c$ of the road, each turning around the ring $m$ $n$ and being unhooked from the inner wall of the ring $r$ $s$. Oblique turning of said strips is made possible through the particular form of the loops or eyes $s$, a sectional view of which appears in Figure 3. As therein represented, each eye is formed with a tapered internal annular shoulder $o'$ analogous to a knife-bearing, and which engages ring $m$—$n$ to rock about the same as a center.

One of the strips has been illustrated in Figure 4. Said strip bears against the outer surface of the tire by the inner undulated surface $d$, $e$, $f$, $i$, $h$, of its tread portion whereby relative movement between the strips and the tire is avoided when tangential stresses due to braking or other causes are produced.

In order to set the protective cover upon the wheel, the ring $m$ $n$ is first inserted through the loops $o$ of the strips, the ends of said ring being then closed together by the interlock or turn-buckle represented in Figs. 5 and 6 or by any other suitable means. The whole is then placed upon the wheel with said ring $m$ $n$ at the inner side thereof.

The free ends of each of the strips are then successively hooked upon the flange of the ring $r$ $s$, the strips being then compressed and held by drawing the ends of the ring together in the manner shown in Figure 7 or in any other suitable way.

A protective cover of this nature greatly reduces wearing of the tires, allows the use of sand when braking and may be used to good purpose particularly when travelling on stony roads or sand.

It is obvious that some constructional and other changes may be made without departing from the scope of my present invention as hereinafter claimed.

Having now fully described and ascertained the nature of my present invention and in what manner the same is to be carried into practice, I declare that what I claim and desire to protect by Letters Patent is:—

1. A protective cover for tires, comprising a multiplicity of individual bowed strips adapted to transversely and conformably straddle a tire, in combination with a pair of rings adapted to be disposed against the inner and outer side faces of the tire; each strip having at one end an eye or loop through which one ring passes and having its other end loosely engaged with the other ring, each eye being formed with an internal annular knife bearing engaging the first-named ring to enable the corresponding strip to rock obliquely in either direction and relatively to the tire about said first-named ring as a center.

2. A protective cover for tires, comprising a multiplicity of individual bowed strips adapted to transversely and conformably straddle a tire, in combination with a pair of rings adapted to be disposed against the inner and outer side faces of the tire; each strip having at one end an eye or loop through which one ring passes and having its other end loosely hooked into the other ring, said other ring being of trough-section to receive the hooks, each eye being formed with an internal annular knife bearing engaging the first-named ring to enable the corresponding strip to rock obliquely in either direction and relatively to the tire about said first-named ring as a center.

3. A protective cover for tires, comprising a multiplicity of individual bowed strips adapted to transversely and conformably straddle a tire, a ring disposed against the inner side face of the tire, and a separate ring of trough-section disposed against the outer side face of the tire; each strip having at one end an eye or loop through which the inner ring passes and having a hook at its other end for loose engagement in the outer ring, each eye being formed with an internal annular knife bearing engaging said inner ring to enable the corresponding strip to rock obliquely in either direction and relatively to the tire about the inner ring as a center.

4. A protective cover for tires, comprising a multiplicity of individual bowed strips adapted to transversely and conformably straddle a tire, a ring disposed against the inner side face of the tire, and a separate ring of trough-section disposed against the outer side face of the tire and having its outer wall of greater width than its inner wall to protect the said outer side face of the tire against rubbing; each strip having at one end an eye or loop through which the inner ring passes and having a hook at its other end for loose engagement in the outer ring, each eye being formed with an internal annular knife bearing engaging said inner ring to enable the corresponding strip to rock obliquely in either direction and relatively to the tire about the inner ring as a center.

5. A tire armor member consisting of a bowed strip adapted to transversely and conformably straddle a tire and having at one end an eye or loop which is formed with an internal annular knife bearing.

In testimony whereof I affix my signature.

JOSÉ LUIS DELPINI.